United States Patent [19]

Dona

[11] 4,271,713
[45] Jun. 9, 1981

[54] SPEED- OR MOVEMENT-REDUCING DRIVE

[75] Inventor: Marinus J. J. Dona, Eindhoven, Netherlands

[73] Assignee: U.S. Philips Corporation, New York, N.Y.

[21] Appl. No.: 42,656

[22] Filed: May 25, 1979

[30] Foreign Application Priority Data

Jul. 6, 1978 [NL] Netherlands ................. 7806175

[51] Int. Cl.³ .................................................. F16H 15/28
[52] U.S. Cl. ........................................ 74/198; 74/212
[58] Field of Search ................. 74/198, 190, 196, 200, 74/202, 206, 212

[56] References Cited

U.S. PATENT DOCUMENTS

| | | | |
|---|---|---|---|
| 2,565,828 | 8/1951 | Vivie | 74/206 X |
| 2,781,667 | 2/1957 | Giskes | 74/206 |
| 2,951,384 | 9/1960 | Rouverol | 74/198 |
| 3,116,990 | 1/1964 | Duer | 74/198 X |
| 3,367,198 | 2/1968 | Schottler | 74/198 |
| 3,527,112 | 9/1970 | Korell | 74/206 X |
| 3,727,473 | 4/1973 | Bayer | 74/198 |
| 3,844,521 | 10/1974 | Berger et al. | 74/202 X |

*Primary Examiner*—C. J. Husar
*Assistant Examiner*—Moshe I. Cohen
*Attorney, Agent, or Firm*—David R. Treacy

[57] ABSTRACT

A reduction drive having a drivable first structural member which presses a number of bodies of revolution against at least one thin intermediate plate. The intermediate plate is connected to the output of the drive and is supported by a second structural member. The material of the intermediate plate has a modulus of elasticity at least equal to that of the second structural member, and the bodies of revolution are pressed with sufficient force to locally but elastically deform the plate and second member.

5 Claims, 5 Drawing Figures

SPEED- OR MOVEMENT-REDUCING DRIVE

BACKGROUND OF THE INVENTION

The invention relates to a drive, comprising a number of bodies of revolution which are pressed against an intermediate plate by a drivable first structural member so as to roll on the plate, the intermediate plate being connected to the output section of the drive and being supported by a second, plate-shaped structural member. Such drives provide a large ratio between the speeds or movement distances of the first member and the output section.

A drive of the kind which forms the subject of the present invention is known from German Ausleges-chrift No. 1,204,038. The intermediate plate of this known drive is formed by an elastically deformable cylinder or belt, the bodies of revolution, such as balls or rollers, which roll across the cylinder or belt being pressed into the material of the cylinder or belt and upthrusting this material during the rolling.

A drawback of this known drive is formed by its comparatively low rigidity, i.e. when the input structural member is restrained, some movement of the output section connected to the intermediate plate is possible when forces are exerted thereon. Particularly for machines and mechanisms which are required to operate with high precision, high rigidity is very important.

SUMMARY OF THE INVENTION

The invention has for its object to provide a drive of the described kind which has a very high rigidity.

In order to achieve this object, the drive in accordance with the invention is characterized in that the intermediate plate is flexible only in the direction transversely of the second plate-shaped structural member, the material of the intermediate plate having a modulus of elasticity which at least equals the modulus of elasticity of the material of the second, plate-shaped structural member.

Because the intermediate plate of the drive in accordance with the invention is constructed to be hard and thin, pressing of the bodies of revolution will cause an impression in the second plate-shaped structural member by locally deforming the second member elastically. The intermediate plate follows this impression, so that during each revolution of a body of revolution the intermediate plate moves with respect to the lower second plate over a distance which is equal to the difference between the length of the arc and the chord of the impression. Thus, very high transmission ratios between the first member and the intermediate plate can be achieved. Because the intermediate plate is made of a hard material so that it is very rigid in the movement direction, it will be substantially impossible to move the outgoing part when the first member is restrained and large forces are exerted on the outgoing part.

In order to enable variation of the transmission ratio, a further embodiment of the drive in accordance with the invention is characterized in that it includes means for varying the force by which the bodies of revolution can be pressed against the intermediate plate.

Variation of the pressure causes a variation of the depth of the impression of the bodies of revolutions in the supporting second plate-shaped structural member. Thus the ratio between the chord and the length or arc of this impression is also varied, and hence also the transmission ratio.

A further preferred embodiment is characterized in that the first member is plate-shaped and that at the most three bodies of revolution are present between the first plate-shaped member and the intermediate plate. This number ensures that the pressure is equally distributed over the bodies. Thus, each of these bodies is in the same conditions and has the same transmission ratio. When a larger number of bodies are present, one or more bodies are liable to be pressed less than the other bodies. This means that not all bodies have the same transmission ratio, and this inequality causes blocking of the drive.

The invention will be described in detail hereinafter with reference to the accompanying diagrammatic drawing.

DESCRIPTION OF THE PREFERRED EMBODIMENTS

Figure 1:
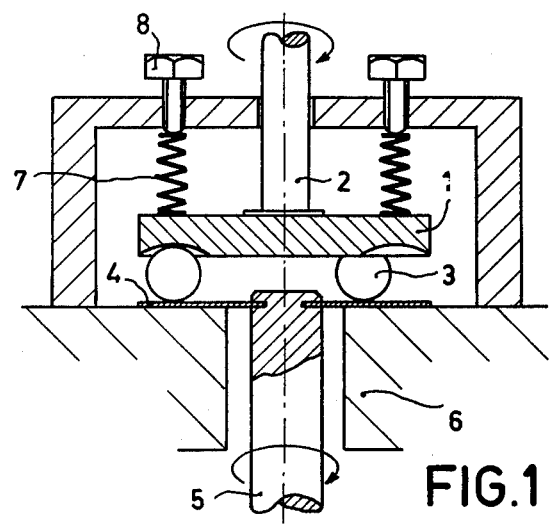
FIG. 1 is a sectional view of a rotary drive in accordance with the invention.
Figure 1A:
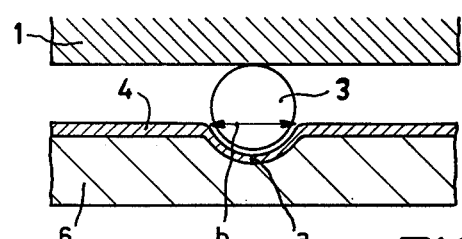
FIG. 1a is an enlarged partial section of the drive of FIG. 1 showing the local deformation of the second member.

The drive which is diagrammatically shown in FIG. 1 comprises a first plate-shaped structural member 1 fastened to an input shaft 2 which can be coupled to a drive. The plate-shaped member 1 cooperates with a number of balls 3 which bear against an intermediate plate 4 in the form of a thin diaphragm. The intermediate plate 4 is connected to an output shaft 5. The intermediate plate 4 is supported by a second plate-shaped support or member 6. The material of the intermediate plate 4 has a modulus of elasticity which is higher than that of the material of the support 6. Springs 7 press the member 1 against the bodies of revolution 3. As a result of this pressure, each of the balls 3 is pressed into the material of the support 6 as is diagrammatically shown in FIG. 1a. The thin and hard diaphragm 4 is then bent, but it is not substantially deformed radially or tangentially, because the material of the diaphragm 4 is harder than that of the support 6. When the member 1 is moved, the balls 3 on the one side roll along the lower side of the member 1 and on the other side along the deformed diaphragm. Therefore, during one revolution of a ball, it travels a distance $2\pi r$ along the member 1, which during the rolling along the impressed diaphragm the length of the diaphragm part travelled by the ball usually equals a $2\pi r$ plus the difference between the length of the arc a minus the length of the chord b. Therefore, the transmission ratio is very high. When the plate 1 is displaced over a distance $2\pi r$, the diaphragm is displaced only over a distance equal to the difference between the length of the arc a and the length of the chord b. This clearly demonstrates that the degree of impression (decisive for the length of the arc and the chord) determines the transmission ratio. The impression is then determined by the force of the springs 7 which press the member 1 against the balls. Variation of the spring force, which can be realised in various manners and which is indicated in the drawing by way of adjusting screws 8 for the sake of simplicity, can thus vary the transmission ratio as desired.

On the basis of the principle shown in FIG. 1, various drives can be realised.

Figure 2:
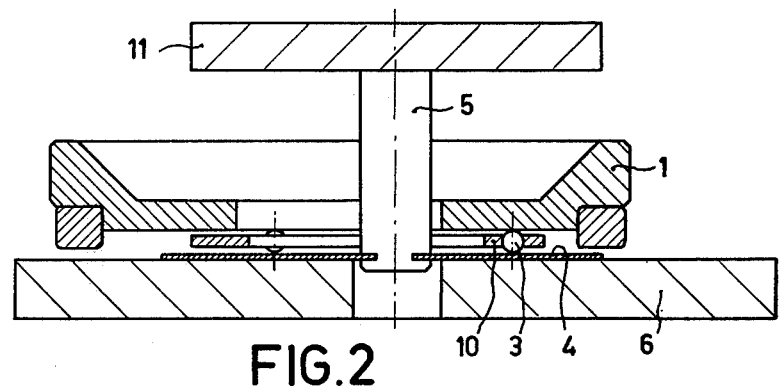
FIG. 2 shows a manipulator.

For example, FIG. 2 shows an adjusting table whose table can be adjusted in two mutually perpendicular directions as well as in the direction of rotation.

This mechanism again comprises a plate-shaped member 1, the balls 3, the diaphragm 4 and the support plate 6. In this case, the balls 3 are accommodated in a cage 10. The diaphragm 4 is connected to a table 11 via a shaft 5. The plate 1 can be moved in all three directions, the diaphragm 4 following this movement with a transmission ratio as described with reference to FIG. 1.

Figure 3:
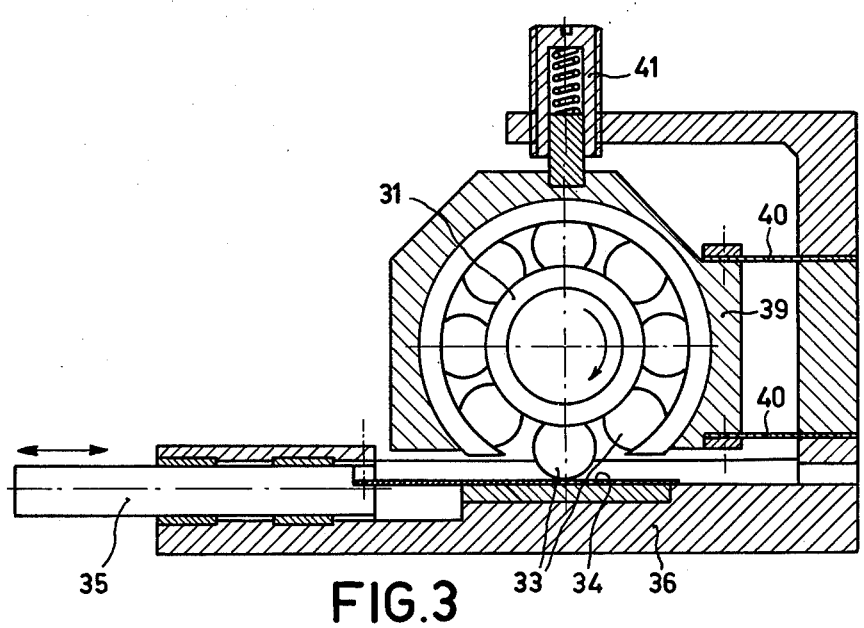
FIG. 3 shows a linear step motor.

FIG. 3 diagrammatically shows a linear step motor. This motor comprises, as an equivalent of the plate-shaped member of FIG. 1, a rotatable member or shaft 31 which can be coupled to a motor. This shaft 31 is enveloped by a ring of balls or rollers 33 which are enveloped by a housing 39 which is suspended from springs 40. One of the balls or rollers 33 is in contact with a diaphragm 34 which is connected to the output part 35. The diaphragm 34 is supported by a plate 36 of a material which is softer than that of the diaphragm 34. The force by which the balls are pressed against the diaphragm can be adjusted by means of an adjusting screw 41. In this embodiment, only one ball or roller 33 is in contact with the shaft 31 and the diaphragm 34 at any instant. The operation is again based on the same principle as is illustrated in FIG. 1.

Figure 4:
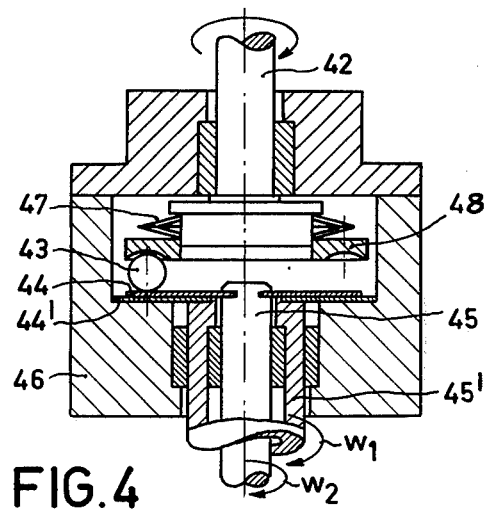
FIG. 4 shows a drive comprising an ingoing shaft and two outgoing shafts which rotate at different speeds.

FIG. 4 diagrammatically shows a drive which comprises an input shaft 42 which is connected to a plate-shaped member which presses against balls 43. The balls 43 now cooperate with two diaphragms 44 and 44' which are connected to two output shafts 45 and 45', respectively. The diaphragms are again supported by a second member 46. The balls can be pressed more or less by means of the spring 47. The two diaphragms may exhibit a slightly different impression, so that the shafts 45 and 45' will rotate at slightly different speeds.

What is claimed is:

1. A reduction drive comprising a drivable first structural member, a second structural member, an output section, a thin intermediate plate connected to the output section and supported by the second structural member, at least one body of revolution disposed between the first structural member and the intermediate plate, and means for pressing the first member toward the second member so as to press said at least one body against the intermediate plate, wherein the intermediate plate is formed of a material having a modulus of elasticity at least equal to the modulus of elasticity of the material of said second member, and said means is arranged to pess said at least one body against the plate with sufficient force to deform said plate and second member locally and elastically.

2. A drive as claimed in claim 1 wherein said means comprises means for varying the pressing force, whereby the ratio of first member to output movement can be varied.

3. A drive as claimed in claim 1 or 2, wherein said first and second members are plate-shaped, and said drive includes at most three said bodies of revolution.

4. A drive as claimed in claim 1 or 2, wherein said drive comprises a plurality of said intermediate plates connected to respective output sections.

5. A drive as claimed in claim 4, wherein said first and second members are plate-shaped, and said drive includes exactly three said bodies of revolution.

* * * * *

UNITED STATES PATENT AND TRADEMARK OFFICE
CERTIFICATE OF CORRECTION

PATENT NO. : 4,271,713
DATED : June 9, 1981
INVENTOR(S) : MARINUS J.J. DONA

It is certified that error appears in the above—identified patent and that said Letters Patent is hereby corrected as shown below:

On the Title Page under Foreign Application Priority Data, item 30, change the date to read --June 7, 1978--

Col. 4, Line 19, After "to" change "pess" to read --press--

Signed and Sealed this

Twentieth Day of April 1982

[SEAL]

Attest:

GERALD J. MOSSINGHOFF

Attesting Officer   Commissioner of Patents and Trademarks